United States Patent [19]
Karlsson et al.

[11] Patent Number: 5,866,859
[45] Date of Patent: Feb. 2, 1999

[54] SPARK ARRESTING STRUCTURE FOR A MUFFLER HAVING A CATALYTIC CONVERTER

[75] Inventors: Egon Karlsson, Jönköping; Robin Wästberg, Gråbo, both of Sweden

[73] Assignee: Aktiebolaget Electrolux, Stockholm, Sweden

[21] Appl. No.: 894,849

[22] PCT Filed: Feb. 14, 1996

[86] PCT No.: PCT/SE96/00190

§ 371 Date: Aug. 11, 1997

§ 102(e) Date: Aug. 11, 1997

[87] PCT Pub. No.: WO96/25589

PCT Pub. Date: Aug. 22, 1996

[30] Foreign Application Priority Data

Feb. 14, 1995 [SE] Sweden .................................. 9500522

[51] Int. Cl.⁶ ........................................................ F01N 3/02
[52] U.S. Cl. ........................................... 181/230; 181/231
[58] Field of Search ..................................... 181/230, 231, 181/240, 258, 282, 283; 60/299, 302

[56] References Cited

U.S. PATENT DOCUMENTS

| 4,574,913 | 3/1986 | Fukuda . |
| 5,048,290 | 9/1991 | Lavenius et al. . |
| 5,177,962 | 1/1993 | Hall et al. ................................. 181/231 |
| 5,451,728 | 9/1995 | Chandler et al. ......................... 181/230 |
| 5,521,339 | 5/1996 | Despain et al. ........................... 181/230 |
| 5,651,246 | 7/1997 | Nagao et al. ............................. 180/240 |
| 5,722,237 | 3/1998 | Iida et al. ................................. 181/240 |

Primary Examiner—Khanh Dang
Attorney, Agent, or Firm—Pearne, Gordon, McCoy & Granger LLP

[57] ABSTRACT

Muffler with catalytic converter (1) essentially arranged in direct connection with a combustion engine's exhaust port and mainly intended for portable working tools such as chain saws. A spark arrester screen (3), i.e. a structure (3) which at least partly contains a wire mesh (4) and a net (4), usually made of metallic material, is located in the exhaust gas flow downstream a converter element (5). In connection with the spark arrester screen (3), upstream or downstream the screen, flow dividers (8, 13, 9) are arranged.

15 Claims, 4 Drawing Sheets

SPARK ARRESTING STRUCTURE FOR A MUFFLER HAVING A CATALYTIC CONVERTER

TECHNICAL FIELD

The subject invention refers to a muffler with catalytic converter arranged basically in direct proximity to an exhaust port of a combustion engine and mainly intended for portable power equipment such as chain saws.

BACKGROUND OF THE INVENTION

For portable power equipment such as chain saws, mufflers have since long in some cases been equipped with so called spark arresters. This arrester was then often positioned at the outlet of the muffler with the function to trap any sparks so that these did not exit the muffler. For a two-stroke engine chain saw for instance, the exhaust gases have a temperature of approximately 600 degrees C. when entering such a spark arrester screen. The mesh is commonly made of stainless acid proof material in order to stand such high thermal loads.

Small combustion engines have since long had comparatively high exhaust emission levels. This particularly applies to two-stroke type engines, because the combustion is more incomplete than in the case of four-stroke engines. Increased demands concerning exhaust emissions from small engines have however resulted in the introduction of catalytic converters for different types of small engines. This also applies to small engines for portable equipment such as chain saws etc.. Several different solutions for so called catalyst mufflers, particularly for chain saws, have emerged. These mufflers are usually connected directly to the exhaust port of the cylinder. A catalytic element is placed inside the muffler, and in the element an exotherm chemical reaction takes place. For chain saws for instance, this implies a temperature increase inside the muffler from around 600 degrees C. before the catalytic element to around 1000 degrees C. after the catalytic element. The applicant does not know of any case where a muffler with a catalytic converter has been equipped with a spark arrester positioned in the exhaust flow downstream the catalyst element. Due to the high exhaust gas temperature after the element, the working conditions for such a spark arrester become very difficult. At the same time, it is in many cases preferable to position a spark arrester downstream the catalytic element in order to reduce risks for fire and accidents when using the power equipment.

The muffler with catalytic converter in accordance with the invention thus is essentially characterized in that a spark arrester, i.e. a structure that at least partly contains a wire mesh or a screen, usually made of metallic material, is positioned in the exhaust flow downstream a catalytic element. Furthermore the spark arrester screen is usually positioned in close proximity to the exhaust outlet. In order to withstand the high thermal loads on the spark arrester screen, so that a reasonable life time can be obtained, a number of different measures are used, on their own or in combination with each other. Partly design measures on the spark arrester screen itself to achieve a well distributed heating of the screen and good cooling, e.g. measures for separation of the exhaust flow. Partly restriction are use in the muffler upstream to achieve increased turbulence in the exhaust stream and thereby cause better distribution across the spark arrester screen and at the same time achieve better cooling of the exhaust stream before it reaches the spark arrester screen. These and other characteristics and advantages will be apparent from the ensuing description of the preferred embodiments and with the support of the drawing figures.

BRIEF DESCRIPTION OF THE DRAWINGS

The invention will be described in closer detail in the following by way of various embodiments thereof with reference to the accompanying drawing figures.

DESCRIPTION OF EMBODIMENTS

Figure 1:
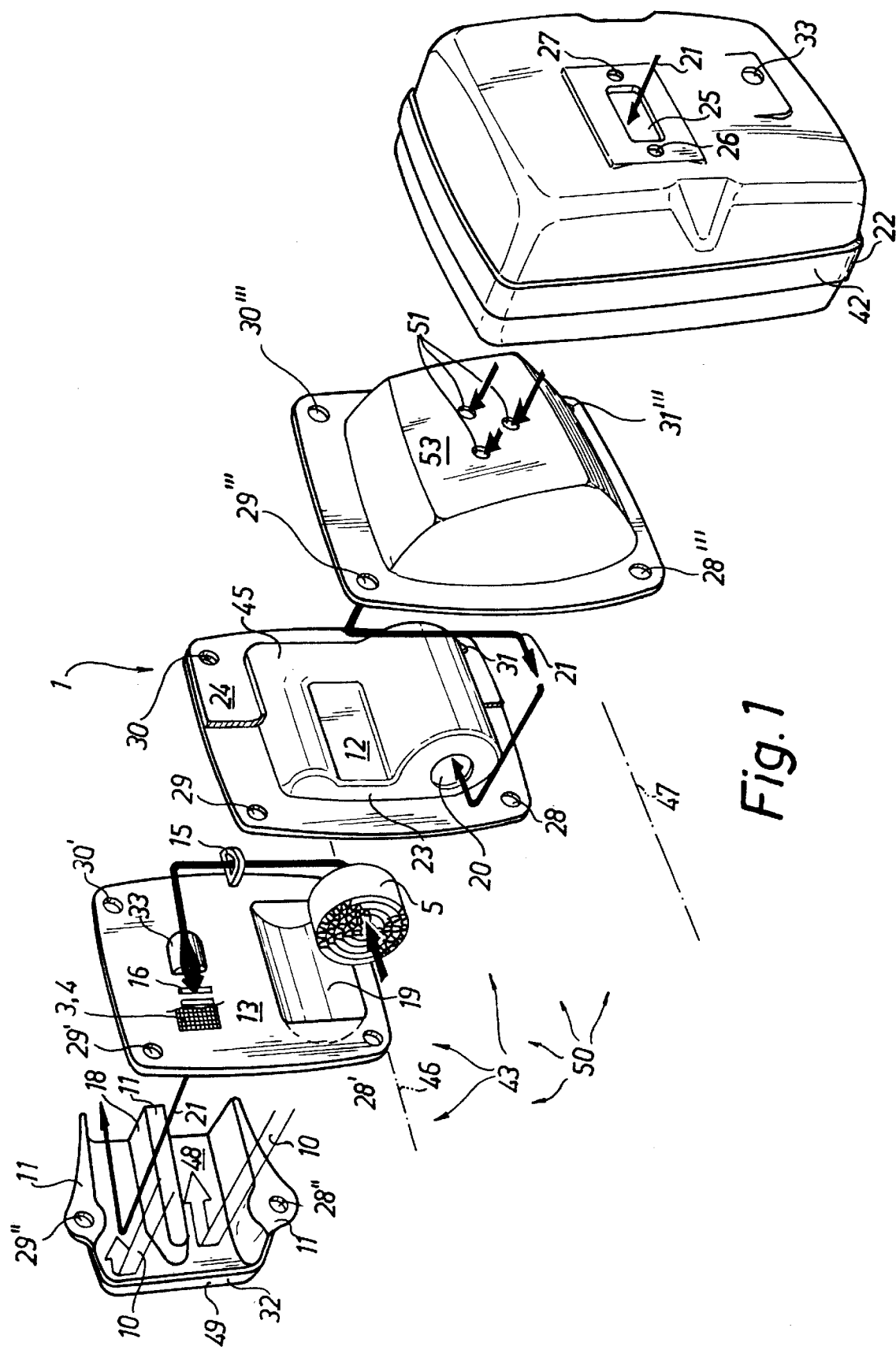
FIG. 1 shows in perspective a catalytic muffler with spark arrester screen according to the invention. Most parts are shown in an exploded view-manner to make the construction and functioning more clear.

In FIG. 1 numeral reference 1 designates a catalytic muffler according to the invention. It is usually composed of two mutually detachable main parts. a muffler 42 and a lid 43, which seals the muffler housing. A baffle 53 with a number of restriction holes 51 can be positioned between the muffler housing 42 and the lid 43, or it can form part of a more complex lid 50. A catalytic element 5 is positioned in the lid 43 and from this element 5 an exhaust duct 45 comes out of the muffler. The exhaust duct 45 is entirely positioned in the lid, so that the exhaust gases are emitted via the lid. The lid is composed of several components joined together, which are here shown in an exploded view. The lid is consequently constructed of an inner plate 12, an outer plate 13 and a cooling air conductor 48. The catalytic element 5 is positioned between the inner plate and outer plate 12 and 13 respectively. It is simply clamped between these two plates. The tree plates 12, 13 and 48 are suitably spot welded together to form lid 43. However, they can also be joined together in other ways.

The catalytic muffler 1 is mounted to the cylinder of the engine. This is achieved by fastening the muffler housing 42 to the exhaust port of the engine with screws inserted in holes 26, 27 and 33. The aperture 25 in the muffler housing 42 corresponds to the exhaust port. On the opposite side of the muffler housing 42 there is a large opening, which facilitates fastening screws through the holes 26, 27 and 33. Exhaust gases 21 from the exhaust port exits into the muffler housing 42. The side of the muffler housing that is hidden in the figure and turn away from the exhaust port aperture 25 is supplied with a fastening plane for the lid 43. This fastening plane has four tapped holes corresponding to the holes 28, 29, 30 and 31. The fastening plane has as mentioned a large opening. Depressions in the inner plate 12 intended for the converter element 5 and the exhaust gas duct 45 protrude into this opening. A gasket 24 is positioned between the lid 43 and the muffler housing 42. For clarity the figure shows a part of the gasket 24 positioned on the inner plate 12. When the baffle 53 is used, it is suitable positioned against the inner plate 12 and spot welded together with the plates 12, 13 and 48 to form a lid 50. The gasket 24 is then positioned on the inside of this lid, i.e. on the baffle 53.

The exhaust gases 21 from the exhaust port of the engine therefore flows out into the muffler housing 42, which, in the first mentioned case, is sealed by the lid 43, except for an aperture 20.The exhaust gases flow in through the aperture 20 and through the converter element 5, which is fixed between the inner plate 12 and the outer plate 13. When the baffle 53 is used, the exhaust gases initially flow through the holes 51 and then through the aperture 20. The converter element is usually composed of at least one strip, normally made of metal, with corrugations or similar, coated with a catalyzing layer. The strip is rolled or folded around a longitudinal axis 46 and the converter element is so positioned that this longitudinal axis 46 is essentially parallel to the crankshaft 47. In this case the converter element consists of two strips rolled together, one corrugated and one flat, and the strips have been rolled together into a cylindrical element. This is clamped between part-cylindrical depressions in the inner and outer plate, 12 and 13 respectively. Also other types of converter elements can be used, e.g. ceramic.

After the exhaust gases 21 have passed through the converter element 5, where they have been cleaned, they proceed in an exhaust gas duct 45, which is integrated in the lid 43, and are then further conducted to an outlet 16. The outlet 16 can consist of stamped apertures in the plate 13. The outlet is equipped with a spark arrester screen 3, whose function is to catch sparks in order to prevent them blowing out of the muffler. The screen 3 is suitably positioned to cover the outlet 16 and between the plates 12 and 13, but other positions are also possible. The exhaust gas outlet 16 has here been designed in the form of so called gills. The aperture in each of these gills is turned in the opposite direction compared to the direction of the exhaust gas flow. Thus the direction of the exhaust gas flow is turned in the gills 16. At the gills the exhaust flow changes its direction 180 degrees. This is important since a cooling air guide plate 48 is positioned on the outside of the outer plate 13 and the cooling air guide plate directs cooling air for mixing with the exhaust gases and for cooling the converter element.

The cooling air guide plate 48 is as mentioned positioned in an outer-most position on the lid 3 and it consists of an outer guide plate 49, which collects and directs cooling air 10 from the cooling fan of the engine between itself and parts of the lid positioned inside it, and a number of abutments 11 which attach the guide plate 49 to inner lid parts by means of e.g. screws and/or welding. The guide plates 49 has an upstream edge 32, and after the cooling air guide plate 48 has been assembled to the other lid parts the upstream edge 32 will be situated well outside the side of the plates 12 and 13. When all three plates have been joined together, e.g. by spot welding the holes 29, 29' and 29" will be in correspondence with each other as well as the holes 28, 28' and 28", where'—designations have been used for holes in the outer plates 13 and "—designations for holes in the cooling air guide plate 48. For holes in the partition walls 53 "—designations have been used. The upstream edge 32 of the outer guide plate 9 is directed almost parallel with the side of the muffler housing 2. Downstream the outer guide plate turns almost through 90 degrees and thus the cooling air 10 is guided in parallel with the outside of the outer plate 13. The cooling air 10 will thus mix with the hot exhaust gases 21 so that the mixed will be at a lower temperature. The cooling air 10 will also sweep over a bulge 19 in the plate 13, the converter element 4 being housed on the inside of the bulge. As the converter element will be very hot this cooling is of great significance.

In this case the outer guide plate 9 of the cooling air guide plate 8 is drawn down towards the outer plate 13 to create a centerfin 18. This centerfin divides the flow of cooling air 10 into one part that runs over the exit 16 and one part that runs over the back side 19 of the housing of the converter element. Thus it is assured that the cooling air is not unevenly distributed between these two important cooling objects.

As is evident from the figure the lid 43 consists of, apart from the cooling air guide plate 48 and the converter element 5, essentially two plates 12, 13. An inner plate 12 and an outer plate 13 and at least one of the inner plate 12 and the outer plate 13 has a depression turned away from the other plate 12, 13, so that therefore the converter element and the exhaust gas duct 45 can be housed between the plates after these have been joined together. In the shown embodiment the cylindrical converter element 5 has been placed between depressions in both the inner plate 12 and the outer plate 13. The depression in the inner plate 12 is bigger than the depression in the outer plate 13. This is desirable because the whole aperture 20 must be located in the inner plate 12. The exhaust gas pipe 45 is however in this case formed entirely as a depression in the inner plate 12, the outer plate 13 remaining essentially flat. There is even a local bulge 33 in the outer plate 13, and this bulge is located just in front of the exit 16. This creates a local throttling and a certain change of the direction of flow towards the outlet 16 that is desirable.

A throttling 15 can be made in the exhaust gas pipe 45 and located between the converter element 5 and the exhaust gas outlet 16 out of the lid, in this case this throttling is formed as a throttling washer 15 fixed between the inner and outer plates 12, 13 and located immediately in front of the exit 16. An advantage of such a throttling formed as a throttling washer is that an accurate throttling can be achieved. But the throttling can also be formed as a contraction in the exhaust gas pipe by way of a decreased depression in one or both of the plates 12, 13, or one plate can be made with a bulge which decreases the area of the channel, for instance the bulge 33. One reason of using a throttling is to throttle the engine on the exhaust side to achieve decreased exhaust emissions. Suitably the throttling is located close to the outlet 16. Of course it would also be possible to form the throttling directly in the outlet 16 or in the spark arresting screen 17. The openings 16 in the muffler and/or the screen holder 9 is then suitably embodied with a smaller total size than otherwise so that they form an additional throttling in the muffler. But a disadvantage would be that many users of the finished product, e.g. a chain saw, would themselves decrease the throttling or take it away to increase the engine output in this way. This would increase the exhaust emissions and would bring a distinct risk of decreased cooling of the exhaust gases.

Furthermore it can be noted that the inlet hole aperture 20, which lets the exhaust gases 21 into the converter element 5, usually has a smaller area than the intake area of the converter element. Suitably the opening 20 has a considerably smaller area than the cross section of the converter element.

As illustrated in FIG. 1 a spark arresting screen, i.e. a structure which at least partly contains a wire mesh 4 or a screen 4. is located in the flow of exhaust gases downstream a converter element 5. As the exhaust gases are substantially heated up in the converter element 5 this positioning downstream the element comes natural. Furthermore, the spark arrester screen is located in close connection to the exhaust gas outlet 16. This is a suitable positioning since the spark arresting screen 3 shall protect sparks from blowing out of the exhaust gas outlet 16. Should for instance a soot particle in the exhaust duct 45 upstream the spark arresting screen be ignited and pulled away with the flow of exhaust gases, the spark arresting screen 3 prevents it from blowing out of the muffler. One result of the spark arresting screen being positioned downstream the converter element 5 is that it is subjected to very high thermal loads. As mentioned, it is desirable that by heating the wire mesh it becomes self-cleansing but not self-destructive. FIG. 1 shows a positioning of the spark arrester screen 3, in which it has been clamped between the plates 12 and 13, but as mentioned also other positionings are possible. With the shown positioning the spark arrester screen cannot be changed separately but the whole lid 43 alternatively 50 must be changed. FIG. 2 to 8 give examples of solutions where the spark arrester screen 3 has been located on the outside of the plate 13, so that it can be possible to change the spark arrester screen separately.

The outlet 16 in FIG. 1 consists of stamped apertures in the plate 13. The exhaust gas flow is distributed to these apertures. The whole plate surfaces between the apertures function as cooling surfaces for the wire mesh 13. Thus through this design a better cooling of the wire mesh and a longer length of life are obtained than if the wire mesh would have been positioned in front of one big aperture, which had functioned as an outlet 16. Thus how the outlet is formed is of great importance. but also the distribution of the exhaust gas flow up to the outlet and its turbulence are very important. These conditions can favorably be influenced by various throttlings 33, 15, 20, 53 positioned upstream the spark arrester screen. As the spark arrester screen can be used together with different types of catalytic mufflers, one or several of these throttlings can be used in combination to improve the working conditions for the spark arrester screen and also to give other design advantages.

The illustrated embodiment in FIG. 1 refers to a preferred embodiment where an exhaust gas duct 45 leads from the converter element 5 to the exhaust gas outlet 16.

The illustrated throttlings 33, 15, 20 and 51 can also have several other favorable effects. One is that reduced exhaust gas emission levels are obtained. Another one is as mentioned that the strains on the spark arrester screen can be lowered and a third one is that a well tuned throttling also can lead to improved noise reduction. The throttling 33 contributes to distribute the exhaust gases sideways and thereby also to distribute the heat strains sideways across the spark arrester screen. Furthermore, the throttling 33 absorbs heat so that it to a certain extent reduces the heat strain on the subsequent spark arrester. The throttling 15 is valuable in that it creates a substantial turbulence, which distributes the flow better over the cross section of the exhaust duct 45 and thereby distributes the flow even better through the spark arrester screen 3. The increased turbulence also results in increased heat absorption in the exhaust duct 45. The throttling 20 upstream the converter element creates in a similar way a substantial turbulence before the element 5 and results in a more even distribution of the flow over the entire cross section surface of the element. This leads partly to a more diff-used flow after the element, and partly to a somewhat increased conversion rate in the element. In a similar way the throttling holes 51 create a substantial turbulence and a cooling effect of the exhaust gases 21, which is a result of the baffle 53 heating up. This is positive considering the spark arrester screen 13.

Of course the catalytic muffler 1 with a spark arrester screen 3 positioned in the exhaust gas flow downstream the converter element 5 can also be embodied in other ways than illustrated in FIG. 1. For instance, the plates 12 and 13 do not have to be joined together, but the element 5 could be positioned in a baffle similar to the plate 12 positioned with a distance to the outer plate 13. Suitably the outer wall 13 is then supplied with an exhaust gas duct corresponding to the duct 45, in which the throttlings 33 and 15 can be embodied. But the outer plate 13 does not need to have an exhaust gas duct. A further baffle, for instance similar to the baffle 53, could be positioned between the outer plate 13 and the baffle 12. Thereby the throttling holes 51 would create turbulence, which is favourable to the subsequent outlet with a spark arrester screen. Also the positioning and the orientation of the converter element 5 in the muffler can vary within a wide range. The muffler can also be embodied in one part, i.e. without a lid.

Figure 2:
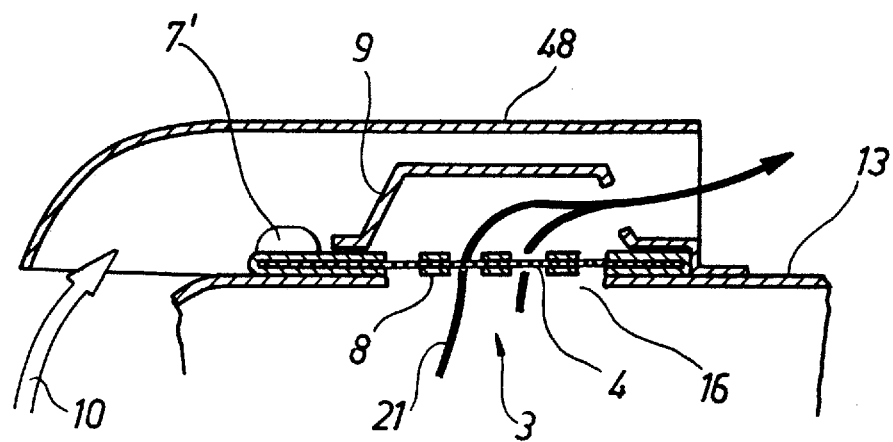
FIG. 2 shows a cut away side view of a type of spark arrester screen attached to a catalytic muffler according to FIG. 1 or a similar catalytic muffler.
Figure 3:
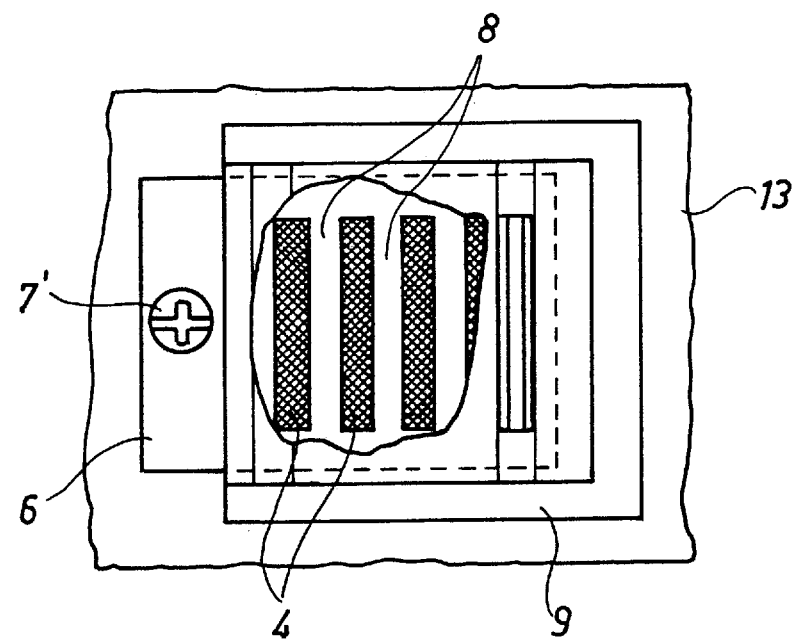
FIG. 3 shows the spark arrester screen according to FIG. 2 from above for clarity the cooling air conductor 48 has been removed.

FIG. 2 shows in cross section a solution where the spark arrester screen 3 is located on the outside of the outer plate 13 or on the outside of a similar catalytic muffler. The cooling air 10 is in this case led by a cooling air duct 48 over the spark arrester screen 3. This leads partly to a lower concentration of the exhaust gases and partly to a cooling of the spark arrester screen and its associated parts. For instance, in the case of a chain saw, the amount of cooling air is about 10 times greater than the amount of exhaust gas and has a considerably lower temperature, approximately 100 to 150 degrees. For some catalytic mufflers a good mix and cooling can be obtained even without the cooling air duct 48. This is especially the case when the cooling air 10 has a suitable direction of flow even without a cooling air duct, which is consequently not necessary, but in many cases advantageous. The same applies to the remaining preferred embodiments which are shown in FIGS. 4 to 8. In the embodiment shown in FIGS. 2 and 3 the spark arrester screen 3 consists of a wire mesh 4 and a fastening device 6. The fastening device consists of a folded plate, which is pressed against the wire mesh to give good contact and heat conduction. Of course the plate could also be joined together with the wire mesh by means of stampings, gluing or soldering. The fastening device itself could also consist of an entirely cast or soldered part onto the wire mesh. This could result in especially good heat conduction away from the hottest parts of the wire mesh. The fastening device 6 is supplied with at least one fastening hole 7 for screw 7' or similar. The fastening device 6 spreads out over the central parts of the wire mesh 4 or the screen 4 in the form of strip 8. It could also be realized in the form of a mesh or similar. The advantage with these strips or meshes is that a division of the effective wire mesh area takes place. Thus the flow is forced to pass through every open section of the wire mesh area and the strips or similar serve as heat conductors. By this division it is always close between a wire mesh aperture and a heat conducting passage 8. The fine-meshed screens that are commonly used are normally relatively poor heat conductors. This partly depends on that the wire mesh itself must have thin wires or nets to limit the flow resistance and partly that the type of the material must be stainless and acid-proof or similar. The latter considering high temperature tolerance and low inclination to corrode or oxidize. The spark arrester screen 3 is here inserted in a wire mesh holder 9, which is mounted to the muffler only along one part of its surrounding edge, here along all sides but one, so that a cleft is created on this side next to a pocket between the wire mesh holder and the muffler itself, so that the spark arrester screen 3 can be inserted into this pocket. The spark arrester screen is tightly fastened by means of a fastening screw 7', which passes through the fastening hole 7 and is screwed into wall 13. The wire mesh holder 9 is here embodied with a cap which has apertures only in one direction, so that hereby the exhaust gases 21 are forced out into a desirable direction. The muffler 1 is supplied with a large aperture 16, which exits into the pocket between the wire mesh holder and the muffler. Of course, also several smaller apertures 16 could be used. Thus the exhaust gases leave the muffler through apertures 16 and through the wire mesh 4 and the wire mesh holder 9.

Figure 4:
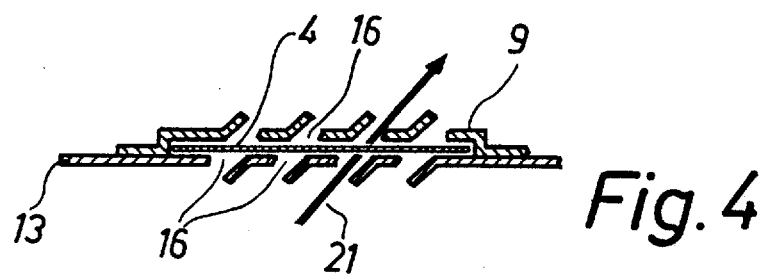
FIG. 4 shows a cut away side view of another embodiment of the spark arrester screen.
Figure 5:
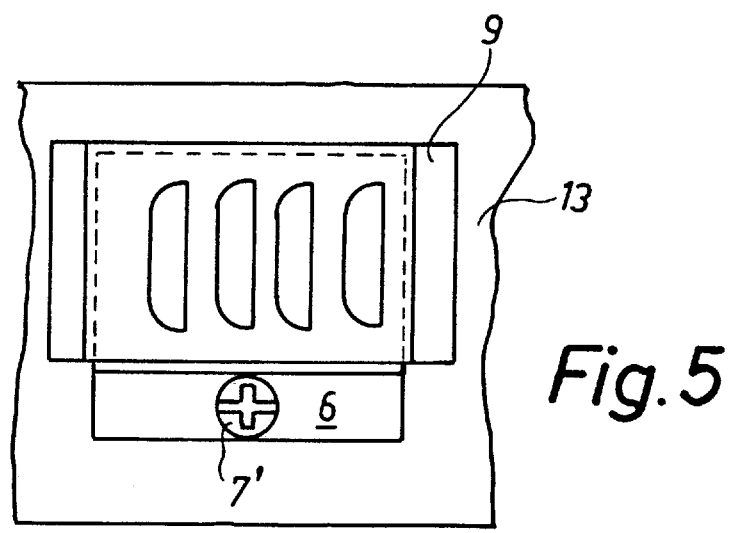
FIG. 5 shows the spark arrester screen according to FIG. 4 from above.

FIG. 4 and 5 show a somewhat different embodiment of the spark arrester screen 3 and the screen holder 9. The apertures which are embodied in the muffler's outer plate 13 and in the wire mesh holder 9 respectively have been given a gill form. Thereby they steer the exhaust gas flow 21 in a desirable direction. The fastening device 6 is in this case embodied only along one side of the wire mesh 4 or the net 4 and it is supplied with at least one fastening hole 7 for screw 7'. This leads to a somewhat simpler spark arrester screen than according to the previously described embodiment. The wire mesh is inserted into the wire mesh holder in the same way, but note that only the wire mesh is going to lie in the pocket between the wire mesh holder 9 and the muffler itself. The solution is simpler, but the heat conduction from the wire mesh will not be as effective as in the former solution. This depends on that the passages of metal, which are spread over the wire mesh on its in side and outside, do not get as good contact and consequently not as good heat conduction. Even this solution is based upon that the wire mesh is divided into several effective sections to even out the heat strain. The effective surface is approximately made as large, as in a fictive case when no division is made, but in the fictive case the areas in the middle of the spark arrester screen would become very hot, which would lead to a considerably shorter length of life, provided that the same type of material is used.

Figure 6:
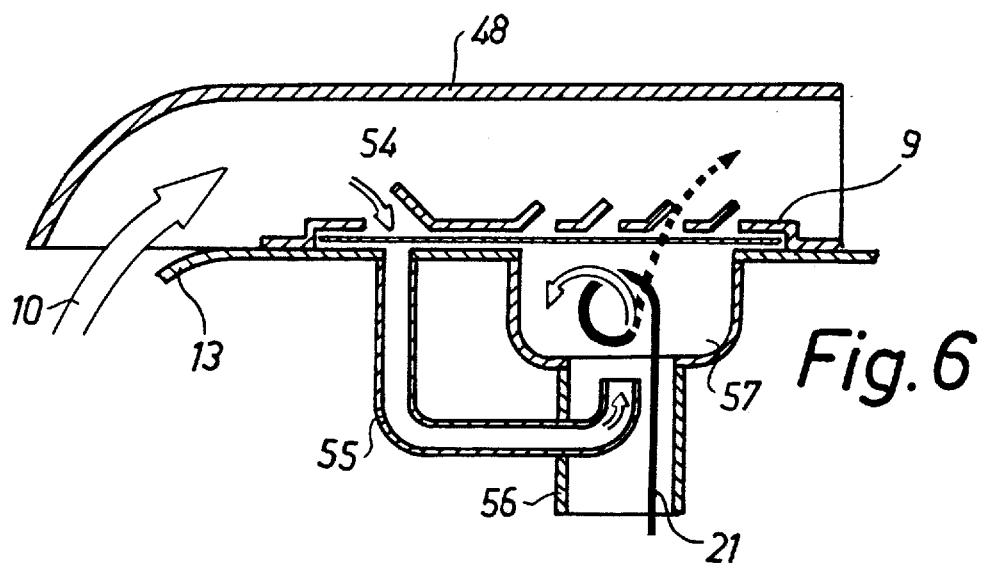
FIG. 6 shows a cut away side view of a further embodiment of the spark arrester screen.

FIG. 6 shows a solution where a similar spark arrester screen 3 as in FIGS. 4 and 5 have been used. The wire mesh holder 9 has here been supplied with an intake 54 for cooling air 10. This cooling air passes through the spark arrester screen 3 and further in a duct 55, which is arranged so that it leads into the exhaust gas duct 56, which leads the exhaust gases 21 to the exhaust gas outlet. The duct 55 exits inside the exhaust gas duct 56, so that an ejector effect is created. Cooling air and exhaust gases are mixed in a mixing chamber 57 so that it subsequently can pass through the spark arrester screen. This embodiment is more complicated than the former ones, but leads to a dilution of the exhaust gases and consequently a reduced temperature of the mixed gases when they pass through the spark arrester screen.

Figure 7:
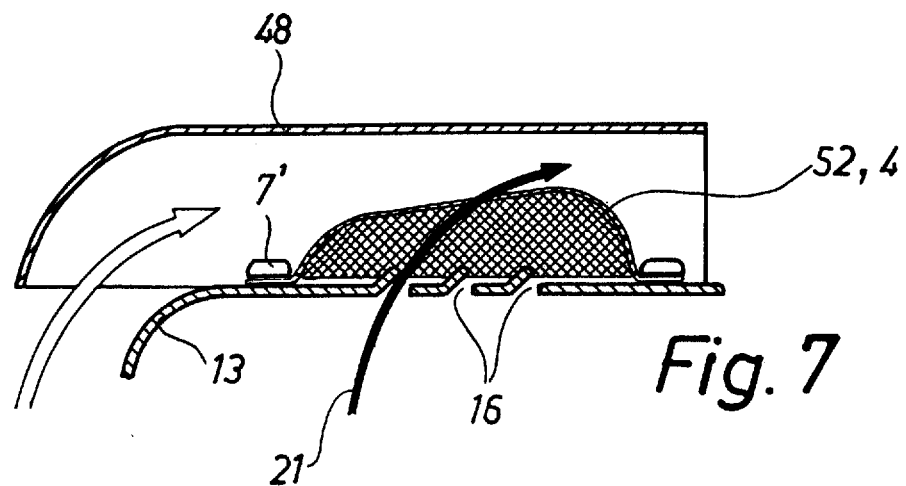
FIG. 7 shows a cut away side view of yet another embodiment of the spark arrester screen.
Figure 8:
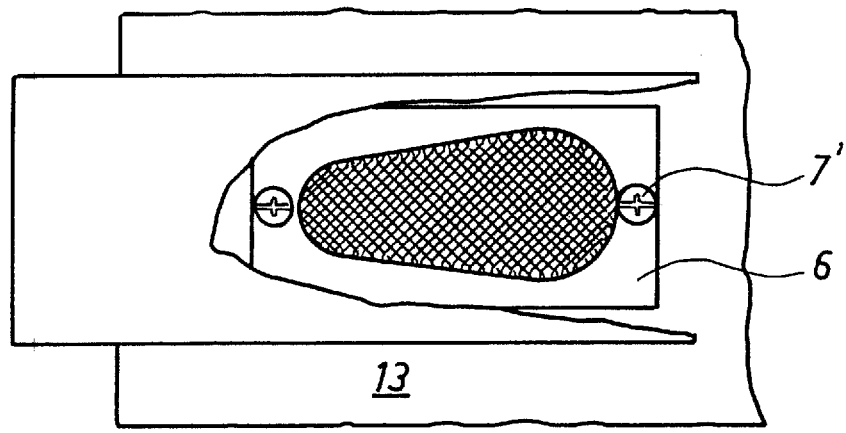
FIG. 8 shows the spark arrester screen according to FIG. 7 from above.

The embodiment according to FIGS. 7 and 8 shows a solution, in which the fine-meshed screen or the net 4 has a vaulted form, and the vaulting is turned outwards from the muffler part itself, a so called wire mesh bulge 52. This wire mesh bulge can for instance be created by pressing a plane wire mesh down into a tool 41 with a suitably formed cavity. The fastening device 6 leads around the entire circumference of the wire mesh 4, but could also have a smaller extension. Two fastening screws 7' are used to fasten the spark arrester screen 3. The fastening device 6 could also improve the cooling of the spark arrester screen. One advantage with the vaulted shape is that the cooling air 10 gains access to cool the spark arrester screen in an effective way. As illustrated in the example the wire mesh bulge 52 is unsymmetrical to create a particularly good cooling effect. Obviously the wire mesh bulge can be embodied more or less symmetrically and in several different ways. When the cooling air duct 48 is used this also serves as a cover for the wire mesh bulge 52.

This is however not absolutely necessary, especially not if the fastening device 6 also leads out over the central parts of the wire mesh or the net 4.

One basic principle is that the flow dividers 8, 9, 13 are used to distribute the exhaust gas flow, so that the spark arrester screen is divided into several effective sections, in order to even out the heat strain. This can for instance be arranged by means of several apertures being embodied in parts 13, 9 arranged upstream 13 and/or downstream 9 the spark arrester screen 3. Of course, also other parts than the above mentioned ones 13, 9 can be used for this purpose.

In the described embodiment the exhaust gas outlet is located on the muffler's front side opposite the exhaust port outlet 25, but the exhaust gas outlet can obviously also be located on anyone of the muffler's remaining sides.

We claim:

1. Muffler adapted for direct connection to a combustion engine exhaust port (2), said muffler comprising a catalytic converter element, a spark arrestor screen, and a flow divider, said spark arrestor screen (3) comprising a wire mesh (4) positioned in the exhaust gas flow downstream of said catalytic converter element (5), said flow divider comprising strips (8) fastened to the spark arrestor screen, said strips (8) being arranged upstream (13) and/or downstream (9) the spark arrester screen (3).

2. Muffler in accordance with claim 1, wherein the spark arrester screen is positioned in close proximity to the exhaust gas outlet (16).

3. Muffler in accordance with claim 1, wherein the wire mesh has a fastening device (6), said fastening device consisting of a folded plate which is secured to the wire mesh (4) and which, in turn, has at least one fastening hole (7) for receipt of a mechanical fastener (7).

4. Muffler in accordance with claim 3, wherein the fastening device (6) is arranged along one side of the wire mesh (4).

5. Muffler in accordance with claim 3, wherein the fastening device (6) surrounds the entire circumference of the wire mesh (4).

6. Muffler in accordance with claim 5, wherein a portion of the fastening device (6) extends out over central parts of the wire mesh (4), said portion being formed as strips (8).

7. Muffler in accordance with claim 3, further comprising a wire mesh holder (9), said wire mesh holder having a peripheral edge and being mounted to the muffler along only a portion of said peripheral edge to form an aperture next to a pocket defined between the wire mesh holder (9) and the muffler, said spark arrester screen (3) being adapted for insertion into said Pocket via said aperture, and the muffler and wire mesh holder (9) define a plurality of exhaust apertures (16), which communicate with the pocket such that the exhaust gases leave the muffler through said exhaust apertures (16) and through the wire mesh (4).

8. Muffler in accordance with claim 7, wherein at least some of said exhaust apertures are shaped and adapted to direct the exhaust gas flow sideways.

9. Muffler in accordance with claim 7, wherein the wire mesh (4) has a vaulted form, and that the vaulting is turned outwards from the muffler part to form a wire mesh bulge (52).

10. Muffler in accordance with claim 7, wherein at least one additional throttling (15, 33, 20, 51) is provided in the muffler (1) through which exhaust gas flow must pass before leaving the muffler.

11. Muffler in accordance with claim 10, wherein at least some of the exhaust apertures (16) have a small size and provide said at least one additional throttling.

12. Muffler in accordance with claim 10, wherein said at least one additional throttling (20) is provided immediately upstream the catalytic converter element (5) by means of an aperture, said aperture having a considerably smaller area than the converter element cross-sectional area and being located in a converter element enclosure.

13. Muffler in accordance with claim 10, wherein said at least one additional throttling comprises a plurality of throttling holes (51) in a baffle (53), said baffle being disposed upstream the converter element (5) in a demarcation, said demarcation dividing the muffler volume between the element (5) and the exhaust port (2).

14. Muffler in accordance with claim 10, wherein a main additional throttling effect is achieved by a plurality of throttling washers disposed downstream of the converter element.

15. Muffler in accordance with claim 14, wherein said at least one additional throttling is located immediately upstream of the spark arrester screen, said additional throttling being provided by a throttling washer (15).

* * * * *